United States Patent [19]

Kraft

[11] Patent Number: 5,768,013
[45] Date of Patent: Jun. 16, 1998

[54] MICROSCOPE STAGE

[75] Inventor: Winfried Kraft, Asslar-Werdorf, Germany

[73] Assignee: Carl Zeiss Jena GmbH, Jena, Germany

[21] Appl. No.: 704,908

[22] Filed: Aug. 30, 1996

[30] Foreign Application Priority Data

Aug. 31, 1995 [DE] Germany ............... 195 32 008.5

[51] Int. Cl.⁶ ................................................. G02B 21/26
[52] U.S. Cl. ............................................ 359/393; 359/391
[58] Field of Search ............................... 359/391–395, 359/368; 356/236, 239; 74/479 R, 479 MM; 108/20, 138–148

[56] References Cited

U.S. PATENT DOCUMENTS

| 4,552,033 | 11/1985 | Marzhauser | 359/393 |
| 4,711,537 | 12/1987 | Schindl et al. | 359/393 |
| 5,228,357 | 7/1993 | Dosaka | 74/479 MM |
| 5,323,712 | 6/1994 | Kikuiri | 359/393 |

FOREIGN PATENT DOCUMENTS

| 500106 | 8/1992 | European Pat. Off. | 359/392 |
| 1978009 | 2/1968 | Germany . | |
| 3514431 | 1/1986 | Germany . | |
| 3521047 | 9/1986 | Germany . | |
| 3027461 | 12/1986 | Germany . | |
| 4-75012 | 3/1992 | Japan | 359/391 |

Primary Examiner—Thong Nguyen
Attorney, Agent, or Firm—McAulay Fisher Nissen Goldberg & Kiel, LLP

[57] ABSTRACT

A microscope stage comprising a first stage part and a second stage part. The first stage part is supported so as to be displaceable along a first displacement direction in the second stage part. The second stage part is supported so as to be displaceable in the stationary guide along a second displacement direction at right angles to the first displacement direction. The microscope stage has a first operating element for the first displacement direction and a second operating element for the second displacement direction. A drive device is included for allowing the second operating element to communicate with the second stage part. The first operating element and second operating element are arranged to be stationary with respect to the first and second displacement directions. A first lever is provided at a first end which is swivelable about a stationary vertical first rotational axis. A second lever is supported at a first end at the second stage part so as to be swivelable in a vertical second rotational axis. The first and second levers are connected with one another at their respective ends via at least one articulation point. The second lever engages a first rotatable end with the first stage part to generate the displacement of the first stage part in the second stage part along the first displacement direction. A mechanism is provided for the transmission of a rotational movement from the first operating element via the first rotational axis and the articulation point, to the first end of the second lever.

7 Claims, 3 Drawing Sheets

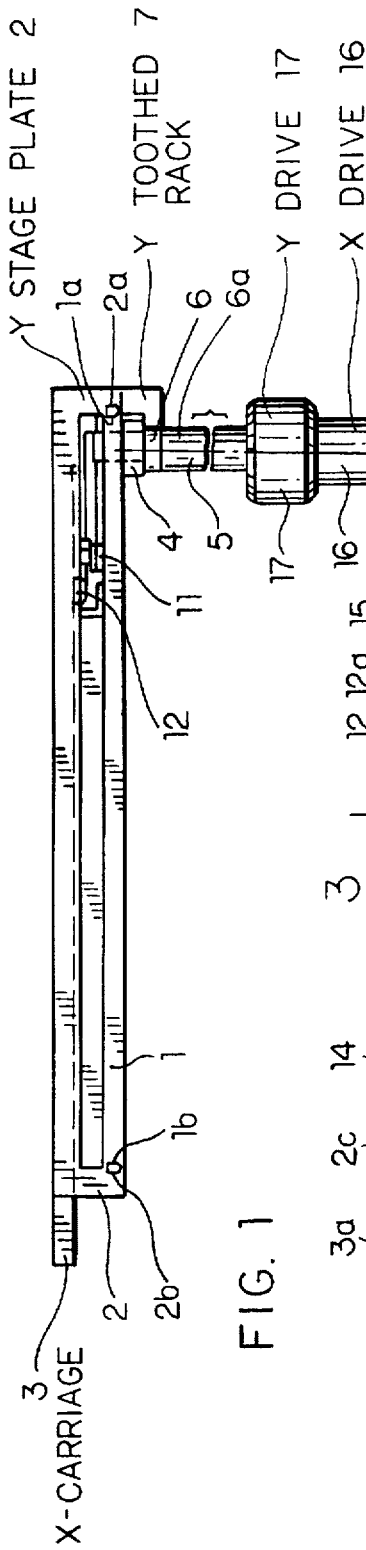
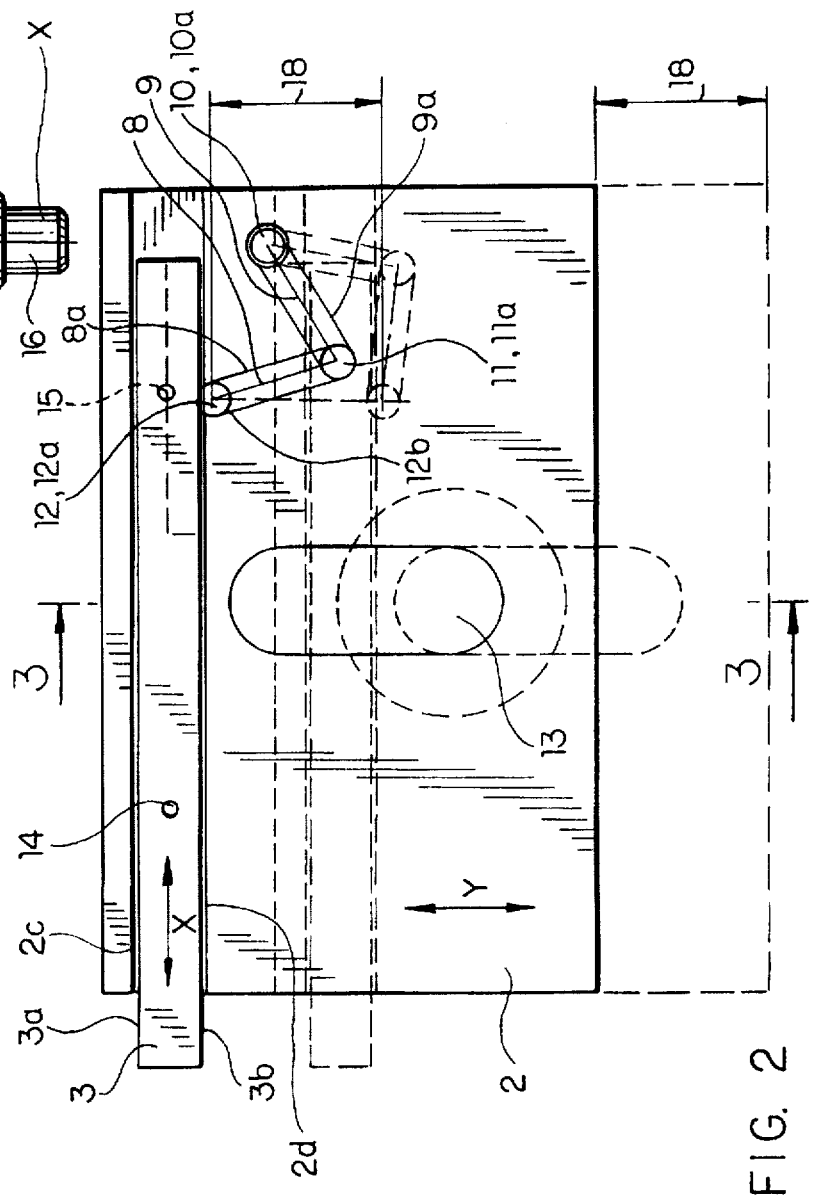
FIG. 1
FIG. 2

5,768,013

MICROSCOPE STAGE

BACKGROUND OF THE INVENTION a) Field of the Invention

The invention is directed to a microscope stage and, in particular, a coaxial drive for a microscope.

b) Description of the Related Art

In conventional mechanical stages for microscopes, the X, Y coordinate movements are actuated by a so-called coaxial drive. The coaxial drive remains stationary during the X-movement. During the Y-movement, the coaxial drive travels in the Y-direction. However, this is extremely unfavorable in ergonomic respects. A constant location of the coaxial drive and accordingly a spatially fixed distance from the precision Z-drive is desirable.

DE 3514431 A1 describes a microscope stage drive with control knobs which are fastened to coaxially supported shafts. The transmission of force is effected by traction means which are guided in a complicated manner and run on deflecting rollers attached to the stage plates. The slip of the traction means which cannot be entirely eliminated does not allow an exactly reproducible stage position. Operation cannot be effected with sufficient sensitivity due to the many deflections. Exact positioning, e.g., in tissue cells in the range of a few microns, is not possible.

Other solutions using stationary adjusting devices but involving considerably more effort with respect to construction are described in DE 3027461 C2 and DE 3521047, although DE 3027461 C2 is concerned rather with the decoupling of the X and Y coordinate movements by means of swiveling out the coaxial drive which is connected with the X-Y movement by means of a friction wheel.

DE-U1 1978009 is directed to an object holder representing a microscope accessory which is generally attached to a microscope stage in order to move objects over the stage plate, which is stationary as a rule.

DE-C1 3521047 describes separate straight-line guides for X and Y. They are expensive and require considerable maintenance and space. The sliding of the profile axle 28 causes vibrations and noise which could distract the user.

OBJECT AND SUMMARY OF THE INVENTION

The primary object of the present invention is a microscope stage of simple construction with a stationary X-Y control panel which nevertheless permits a precise and exactly reproducible stage motion in two spatial coordinates while avoiding the problems of the stages described above.

This object is met in accordance with the invention by a microscope stage comprising a first stage part and a second stage part. The first stage part is supported so as to be displaceable along a first displacement direction in the second stage part. The second stage part is supported so as to be displaceable in the stationary guide along a second displacement direction at right angles to the first displacement direction. The microscope stage has a first operating element for the first displacement direction and a second operating element for the second displacement direction. Drive means are included for allowing the second operating element to communicate with the second stage part. The first operating element and second operating element are arranged to be stationary with respect to the first and second displacement directions. A first lever is provided at a first end which is swivelable about a stationary vertical first rotational axis. A second lever is supported at a first end at the second stage part so as to be swivelable in a vertical second rotational axis. The first and second levers are connected with one another at their respective ends via at least one articulation point. The second lever engages a first rotatable end with the first stage part to generate the displacement of the first stage part in the second stage part along the first displacement direction. Means are provided for the transmission of a rotational movement from the first operating element via the first rotational axis and the articulation point, to the first end of the second lever.

Described hereinafter is a mechanical stage for microscopes in which the coaxial drive always remains stationary during actuation of the X-movement and Y-movement so as to maintain the optimum ergonomic position of the control knobs.

The arm of the person operating the microscope can rest in a relaxed manner on the instrument table or on a corresponding support while comfortably operating the control knobs of the coaxial drive and those of the precision Z-drive (Z-focus). It is no longer necessary to feel around for the Z-drive or, conversely, for the coaxial drive.

Actions and advantages of the invention are described more fully in the following with reference to the drawings.

BRIEF DESCRIPTION OF THE DRAWINGS

In the drawings:

FIG. 1 shows a side view of the microscope stage according to the invention;

FIG. 2 shows a top view with a stage position displaced in the Y-direction shown in dashed lines;

DESCRIPTION OF THE PREFERRED EMBODIMENTS

Figure 3:
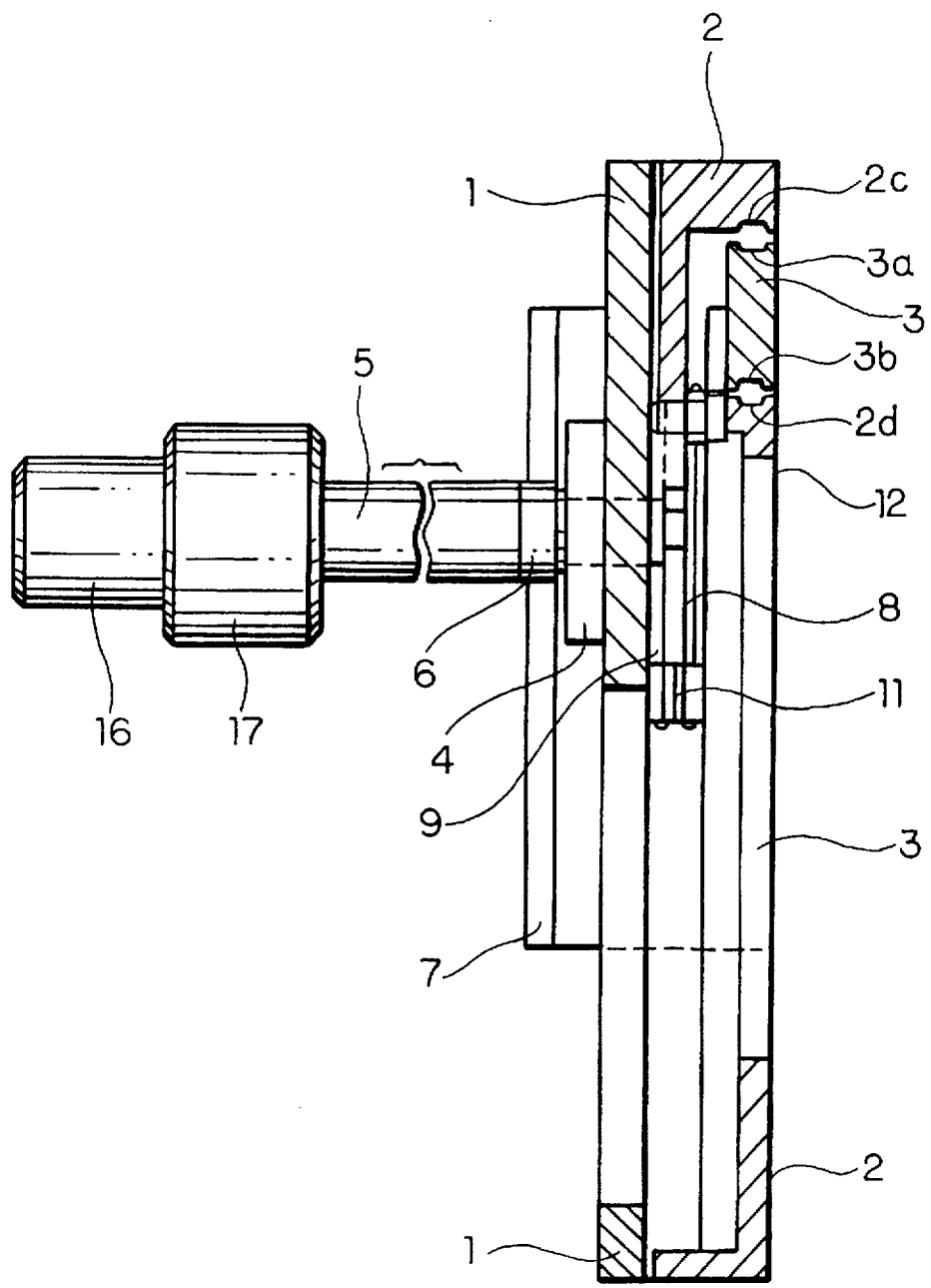
FIG. 3 shows a side view of the microscope stage in partial section along line A—A in FIG. 2.

The basic mode of operation is described hereinafter.

A bottom plate 1 serves to hold the stage assembly on a support, which is not that is, as a stationary reference base.

This bottom plate has guides 1a, 1b in which corresponding guides 2a, 2b of the upper plate 2 engage. The upper plate 2 is supported so as to be displaceable relative to the bottom plate in a Y-direction.

Guides 2c, 2d are provided in this upper plate 2 so that the so-called X-slide or X-carriage 3 can be displaced in the X-direction relative to the upper plate 2.

A coaxial drive 5 which is attached to the bottom plate via a holding part 4, i.e., so as to be stationary relative to plates 2 and 3, has a drive element 16 for the X-movement and a drive element 17 for the Y-movement.

The movement transmission for the Y-direction during the movement of the drive element 17 is effected via driving means 6, 6a in the form of pinions which mesh with a toothed rack 7 at the upper plate 2 and accordingly effect a displacement of the upper plate 2 in the Y-direction relative to the bottom plate 1. A movement of this kind is indicated by the second stage position shown in dashed lines in FIG. 2.

Since the X-carriage 3 is supported in the upper plate 2, it participates in the Y-movement of the upper plate 2.

In order to produce displacement in the X-direction by means of the aforementioned drive element 16 for the X-movement, the lever system 8, 9 according to the invention is fastened so as to be rotatable in a rotational axis 10 at the (stationary) holding part 4 on the one hand and so as to be rotatable in a rotational axis 12 at the upper plate 2 on the other hand so that the lever system having the levers 8, 9 which are connected via an articulation point 11 is displaced as shown in FIG. 2 during the displacement of the upper plate 2.

The pivot bearings 10a, 11a, 12a are connected with one another via driving means such as synchronous or toothed belts.

The flow of force for the X-movement is effected via the drive element 16 for the X-movement at the coaxial drive 5, via a coupling of this drive element by means of a toothed belt, first to the pivot bearing 10a and from the latter via toothed belts 8a, 9a to the pivot bearing 12a.

This pivot bearing 12a has pinions 12b which engage in a toothed rack guide of the X-carriage 3 and which, as was stated on page 4, penultimate paragraph, effect the displacement of the X-carriage 3 relative to the upper part 2.

The lever system 8,9 can advantageously rotate freely during the movement of the upper plate 2 in the Y-direction by means of the pivot bearings 10a, 12a and can change its position and can nevertheless effect an X-displacement owing to the aforementioned transmission of force via the drive means 8a, 9a to the X-carriage in every position of the upper plate 2.

As is shown, an upper plate 2 is provided at a stationary bottom plate 1 which serves among other things to fasten the stage assembly to a support, not shown, and which has two guides 1a, 1b located at its parallel outer sides for forming a guide. The upper plate 2 has, at both of its inner sides, parallel guides 2a, 2b for forming a common guide with the bottom plate 1 in order to realize a Y-movement relative to the bottom plate 1. Parallel guides 2c, 2d are provided in the upper plate for forming a common guide with an X-carriage 3. The X-carriage 3 has parallel guides 3a, 3b externally on both of its long sides for forming a common guide with the upper plate 2 in order to realize the X-movement relative to the upper plate 2.

In a likewise stationary holding part 4 for a coaxial drive 5 which is attached to the bottom plate 1 via the holding part 4, the coaxial drive 5 is attached with corresponding driving means 6, 6a for the Y-movement such as pinions, friction wheels, toothed belt pinions. A device 7 is provided at the upper plate 2 for realizing the Y-movement at said upper plate 2. In the present instance, this device 7 is a toothed rack in which the driving means 6, 6a engage.

A lever system which is formed in the present instance from two levers 8, 9 and which is supported on the one hand so as to be rotatable in a rotational axis 10 at the holding part 4 relative to the coaxial drive 5 and on the other hand so as to be rotatable in a rotational axis 12 at the upper plate 2 relative to the X-carriage 3 carries pivot bearings 10a and 12a at the locations of the rotational axes 10 and 12. The levers 8 and 9 are connected with one another via an articulation point 11 which has an additional pivot bearing 11a.

The pivot bearings 10a, 11a, 12a are connected with one another via driving means 8a and 9a such as toothed belts.

If the pivot bearing 10a is coupled with the coaxial drive 5 or with another drive element for the X-movement, e.g., via toothed belts, a rotational movement is transmitted to the pivot bearing 12a.

Figure 4:
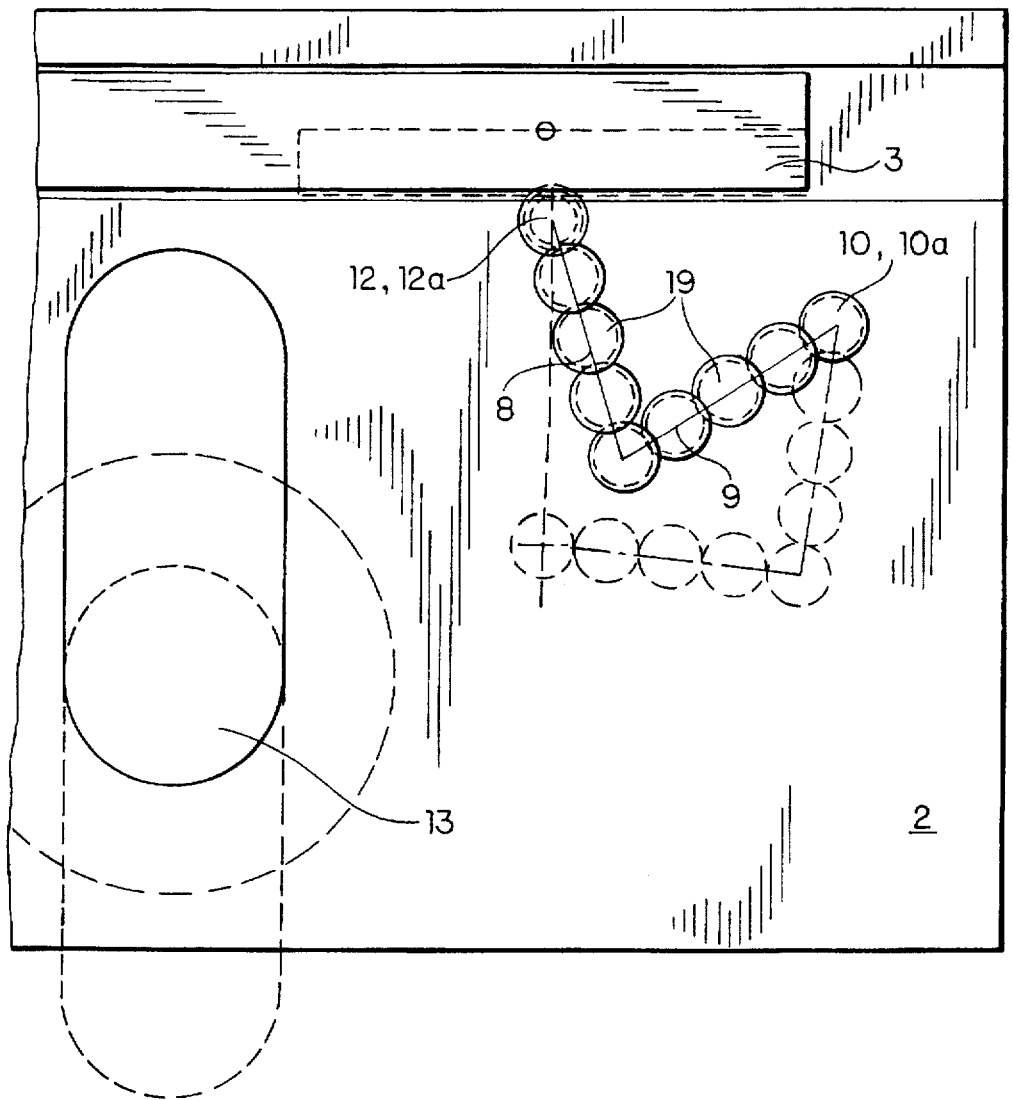
FIG. 4 shows another embodiment form of the lever arrangement according to the invention.

In another construction, the rotational movement can be transmitted from the coaxial drive 5 or from the drive element for the X-movement to the bearing 12a via a combination of a plurality of toothed wheels or friction wheels (19) which are shown schematically in FIG. 4.

Drive means 12b such as pinions which mesh with the X-carriage 3 in order to drive the latter in its guide, e.g., via a toothed rack guide, not shown, which is known in the art, are located at the pivot bearing 12a in the upper plate 2.

If the upper plate 2 is moved in the Y-direction, the lever system 8, 9 changes its position. The articulated position 10 remains constant and the articulated position 12, relative to the upper plate 2, remains constant. Also, the pivot bearings 10a, 12a rotates corresponding to the movement of the upper plate 2.

The free pivot bearing 11 changes it position corresponding to the movement of the stage plate 2.

The drive means 8a, 9a at the lever system are moved by means of the coaxial drive 5 with its drive elements for the X-movement 16 and Y-movement 17. The drive means 8a, 9a in turn rotate the two bearings 11a, 12a and accordingly effect the displacement of the X-carriage 3. The lever 9 is supported at one side coaxially around the axis of the coaxial drive 5.

The X and Y coordinate movements are preferably arranged at an angle of 90° relative to one another. However, this is not obligatory. Other angles are also possible.

The stage assembly can be rotatable in addition if appropriate devices are incorporated in the bottom plate or if the entire stage assembly is fastened to a rotating system.

The lever system as such must be constructed in such a way that the movement of the individual elements is not impeded in any way by contact.

Naturally, the lever system is advantageously so designed that it does not enter the region traversed by the illumination beam path 13 for the full travel in the X- and Y-directions.

The two receptacles (e.g., threaded bore holes) 14, 15 in the X-carriage 3 are intended for holding and fastening the object holder.

The stage travel 18 is balanced according to the invention via the lever system 8, 9.

Owing to the constant engagement of the drive means, the X-movement can be carried out entirely or in partial steps at every point of the Y-movement.

The invention is not restricted to the embodiment examples shown. In particular, the rotational axis 10 on which the pivot bearing 10a is provided can also be located at another stationary location so that the location of the axis of the coaxial drive 5 does not coincide with the rotational axis 10. Further, more than two lever arms can also be provided to form the lever system connecting the rotational axes 10 and 12, wherein a plurality of free articulation points similar to the rotational axis 11 are provided.

Left-hand and right-hand operation are possible, as is conventional, by suitable assembly of the operating elements 16, 17.

While the foregoing description and drawings represent the preferred embodiments of the present invention, it will be obvious to those skilled in the art that various changes and modifications may be made therein without departing from the true spirit and scope of the present invention.

What is claimed is:

1. A microscope state containing a bottom plate, said microscope stage comprising:
    a first stage part,
    a second stage part,
    said first stage part being supported so as to be displaceable along a first displacement direction in said second stage part;

a stationary guide which is formed in said bottom plate;

said second stage part being supported so as to be displaceable in said stationary guide along a second displacement direction at right angles to the first displacement direction;

said microscope stage having a first operating element for driving the first stage part in the first displacement direction and a second operating element for driving the second stage part in the second displacement direction;

drive means for allowing said second operating element to communicate with the second stage part;

said first operating element and second operating element being arranged so as to be stationary with respect to the first and second displacement direction;

a first lever swivelable about a stationary vertical first rotational axis being provided at a first end;

a second lever being supported at a first end at said second stage part so as to be swivelable in a vertical second rotational axis, said first and second levers being connected with one another at respective second ends thereof via at least one articulation point;

said second lever engaging a first rotatable end with the first stage part to generate the displacement of the first stage part in the second stage part along the first displacement direction; and means being provided for the transmission of a rotational movement from the first operating element via the first rotational axis and said articulation point to said first end of the second lever.

2. The microscope stage according to claim 1, wherein the first and second operating elements are coaxial knobs whose rotational axes coincide with the first rotational axis of the first lever.

3. The microscope stage according to claim 1, wherein a gear arrangement is provided for transmitting the rotational movement from the first operating element to the first end of the second lever.

4. The microscope stage according to claim 3, wherein the gear arrangement is formed of meshing toothed wheels.

5. The microscope stage according to claim 3, wherein the gear arrangement is formed of at least one toothed belt.

6. The microscope stage according to claim 3, wherein the gear arrangement is formed of meshing friction wheels.

7. The microscope stage according to claim 1, wherein a pinion is provided at the first end of the second lever for producing the displacement in the first displacement direction, said pinion engaging in a toothed rack guide connected with the first stage part.

\* \* \* \* \*